(No Model.)

J. E. WEAVER.
GAS DISTRIBUTING SYSTEM.

No. 583,666. Patented June 1, 1897.

WITNESSES

INVENTOR

James E. Weaver
by W. Bakewell & Sons
his attorneys

THE NORRIS PETERS CO., PHOTO-LITHO., WASHINGTON, D. C.

United States Patent Office.

JAMES E. WEAVER, OF PITTSBURG, PENNSYLVANIA.

GAS-DISTRIBUTING SYSTEM.

SPECIFICATION forming part of Letters Patent No. 583,666, dated June 1, 1897.

Application filed May 28, 1894. Serial No. 512,599. (No model.)

*To all whom it may concern:*

Be it known that I, JAMES E. WEAVER, of Pittsburg, in the county of Allegheny and State of Pennsylvania, have invented a new and useful Improvement in Gas-Distributing Systems, of which the following is a full, clear, and exact description, reference being had to the accompanying drawings, forming part of this specification, in which—

Figure 1:
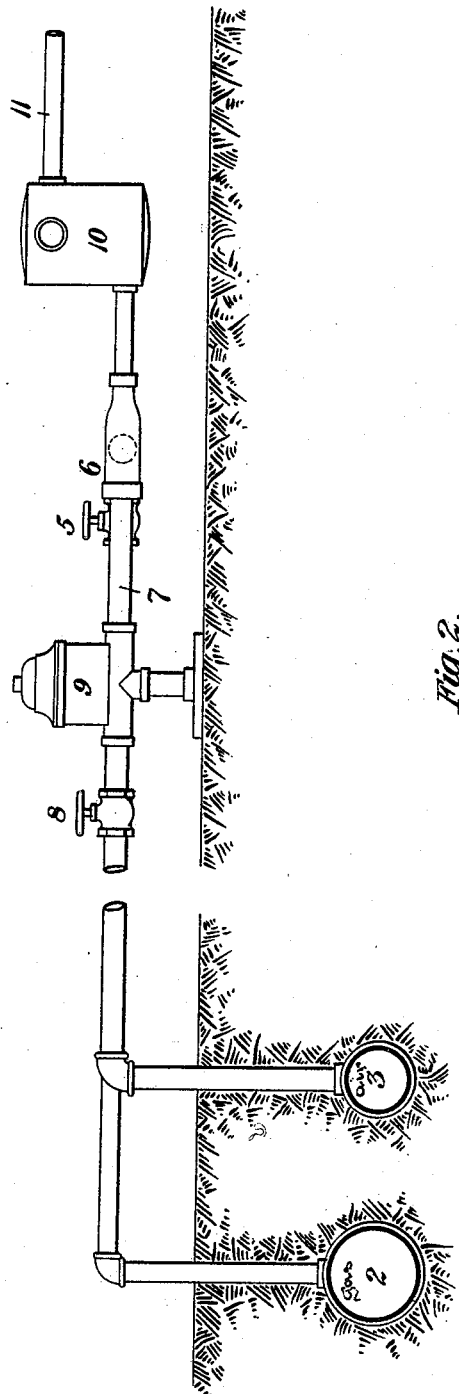
Figure 2:
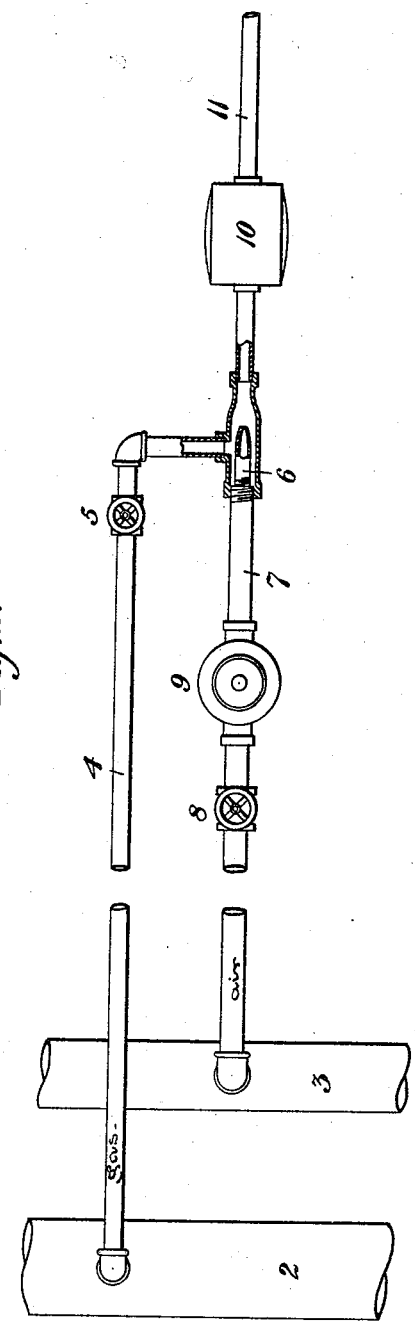

Figure 1 is a side elevation of the service-pipes and connections of my improved system, and Fig. 2 is a top plan view of the same.

My invention relates to the feeding and distribution of gas; and it consists in an improved means for supplying gas to consumers, whereby the difficulties of low-pressure systems are done away with and sufficient air is supplied to and mixed with the gas to afford a perfect combustion of the same. Heretofore it has been proposed to mix air with the gas in the gas-main near the gas-well or the distributing-point. This system is, however, objectionable, as the air and gas separate in passage and stratify in the mains. My invention overcomes this difficulty; and it consists, broadly, in feeding air from a central point in pipes separate from the gas-pipes and connecting the service branches of both air and gas mains just before reaching the meter. In this way a low-pressure gas system may be used, and the pressure in the gas and air mains accurately regulated independently of each other, while they become thoroughly mixed near the point of use.

In the drawings, 2 represents the gas and 3 the air main, each leading from the station or source of supply.

4 is the gas-service pipe or branch leading to the house, this branch having a valve 5 and a right-angled bend or elbow into which leads an injector 6, in which the air-service pipe 7 terminates. The air branch is provided with a valve 8 and with an automatic regulator 9 to secure a constant pressure, and by the air injected into the gas-pipe under pressure a sufficient quantity is introduced to afford complete combustion, or at least to so dilute the gas that when burned the surrounding air will give perfect combustion.

10 is the meter to which the gas-pipe leads, and 11 the pipe to the burners.

The advantages of the system are apparent, since with a low-pressure gas system enough air is forced in under pressure for combustion and stratification is avoided. The system may be used also to advantage with high-pressure gas-mains.

I claim—

A gas-distributing system comprising separate air and gas distributing mains, branches from each main, the air branch having an injector entering the gas branch; substantially as described.

In testimony whereof I have hereunto set my hand.

JAMES E. WEAVER.

Witnesses:
  W. B. CORWIN,
  H. M. CORWIN.